Patented June 12, 1934

1,962,224

UNITED STATES PATENT OFFICE 1,962,224

6,7-DIETHOXY-1-(3',4'-DIETHOXY-BENZYL)-ISOQUINOLINE

Emil Wolf, Budapest, Hungary

No Drawing. Application July 22, 1931, Serial No. 552,553. In Germany August 1, 1930

1 Claim. (Cl. 260—38)

The present invention has for its object to provide a process of preparing derivatives of 1-benzylisoquinoline. The said process consists in treating alkoxy derivatives, more particularly methoxy, ethoxy, allyloxy derivatives of N-phenyl-acetyl-β-phenyl-β-hydroxy-ethylamine, preferably with the application of heat and if desired in the presence of solvents, with halogen-containing derivatives of phosphorus, such as, for example, phosphorus oxychloride, phosphorus pentachloride and the like, as condensation agent. The products obtained by such treatment can subsequently be isolated by the usual methods, for example, by distilling off the solvent and shaking with chloroform after alkalization has been effected.

From the works of Pictet it is known that homoveratroylhydroxyhomoveratrylamine can be converted into papaverine by phosphorus pentoxide. The yield thereby obtainable only amounts, however, to 30% of the theoretical. A still smaller yield is obtained when the Pictet process of preparation is carried out on a large scale. For this reason, this method is unsuitable for an economical technical utilization.

From the communications by C. Mannich and co-workers it is known to use phosphorus oxychloride as condensation agent for the manufacture of papaverine or its homologues. Mannich, however, does not start with N-phenylacetyl-β-phenyl-β-hydroxy-ethylamines of the general formula

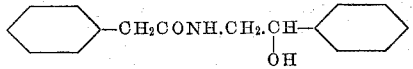

but from their alkyl ethers, corresponding to the following formula:

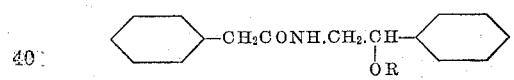

where R represents an alkyl group.

Also by Mannich's process, only small yields are obtained, amounting to only about 40% of the theoretical amount of papaverine, and consequently this process of working is only of limited value.

In contradistinction to these known processes, the present process possesses considerable and unexpected advantages. These consist above all in the fact that the process is extremely easy to carry out technically and also in the very excellent yields which are obtainable by it and which amount, for example, to about 75% and more of the theoretical.

Among the starting materials mentioned in the foregoing the N-phenylacetyl-β-phenyl-β-hydroxy-ethylamines to be used for the present process with particular advantage are such as possess in each of the two benzene nuclei at least for example 2 or 3 alkoxy groups which are identical with one another. More particularly, also, N-(3,4-diethoxyphenylacetyl)-β-oxy-β-(3,4-diethoxyphenyl)-ethylamine has proved to be the most advantageous starting material.

The 1-benzylisoquinoline derivatives, such as for example 6,7-diethoxy-1-(3,4-diethoxy-benzyl)-iso-quinoline, obtained according to the invention from the said starting materials are distinguished by their very valuable therapeutic properties, which are far superior to those of papaverine, while the toxicity is much smaller.

As regards details, the present process may be carried out in very many different suitable ways, for example, by dissolving the starting material in a solvent, such as, for example, chloroform, benzene or the like, subsequently adding the condensation agent, if desired after previous heating of the prepared solution, and warming the whole for several hours under a reflux condenser, or first allowing it to stand at the ordinary temperature and finally bringing the action which is in course of procedure to an end by heating, whereupon the product formed can be isolated by the usual methods. It is also possible to proceed, for example, by first dissolving the condensation agent in a suitable solvent, heating the mixture until it boils, introducing therein a heated solution of the starting material and continuing the heating of the whole until the reaction is completed. It is not absolutely necessary to use diluents or solvents, but generally speaking it is preferable to carry out the condensation in the presence of such solvents in which both the starting materials and the condensation agents are soluble. The course of the reaction is thereby made smoother.

From among the said halogen-containing phosphorus derivatives, phosphorus oxychloride has been found to be best as condensation agent according to the experience so far acquired by the applicant.

The following example will serve to provide more detailed particulars regarding the present process.

(1) 1 part of homoveratroyl hydroxyhomoveratrylamine is dissolved in a neutral solvent, such as, for example, chloroform or benzene. Thereupon, 1 to 3 parts of phosphorus oxychloride are added to the resulting solution and the whole is heated for some hours under a reflux condenser. It should be pointed out here that it is also possible to proceed by allowing the amide solution to flow on to the phosphorus oxychloride with the application of heat or in the cold. Instead of this, it is also possible to carry out the reaction in such a way that the reaction mixture is first allowed to stand in the cold and the reaction is then completed by heating. The base produced in both cases is obtained by shaking with chloroform after distilling off the solvent and after alkalization. The melting point of the base is 145–147° C.

(2) 1 part of N-(3,4-diethoxyphenylacetyl)-β-oxy-β(3,4-dimethoxyphenyl)-ethylamine is dissolved in 2 parts of benzene, 1 to 2 parts of phosphorus pentachloride are added thereto and the whole is heated to boiling. After heating for several hours, the base which is formed can be isolated by the usual methods. Melting point of the product which is isolated as an oxalate: 147° C.

(3) 1 part of N-(3,4-diethoxyphenylacetyl)-β-oxy-β-(3,4-diethoxyphenyl)-ethylamine is dissolved in benzene or chloroform, mixed with 1 to 3 parts by weight of phosphorus oxychloride and boiled under a reflux condenser for 3 hours, whereupon the corresponding tetra-ethoxyisoquinoline base can be isolated in the usual way. The melting point of the base is 99–101° C.

I claim:

6,7 diethoxy-1-(3',4'-diethoxybenzyl)-isoquinoline.

EMIL WOLF.